(12) United States Patent
Hulsen et al.

(10) Patent No.: US 7,359,633 B2
(45) Date of Patent: Apr. 15, 2008

(54) ADDING METADATA TO PICTURES

(75) Inventors: Peter Anton Hulsen, Eindhoven (NL); Keith Baker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 225 days.

(21) Appl. No.: 10/542,835

(22) PCT Filed: Dec. 16, 2003

(86) PCT No.: PCT/IB03/06151
§ 371 (c)(1),
(2), (4) Date: Jul. 20, 2005

(87) PCT Pub. No.: WO2004/066613
PCT Pub. Date: Aug. 5, 2004

(65) Prior Publication Data
US 2006/0110154 A1   May 25, 2006

(30) Foreign Application Priority Data
Jan. 21, 2003   (EP)   ................................. 03100117

(51) Int. Cl.
*G03B 17/24*   (2006.01)
(52) U.S. Cl. ........................... 396/310; 725/12; 725/62
(58) Field of Classification Search ................ 396/310; 725/12, 62
See application file for complete search history.

(56) References Cited

U.S. PATENT DOCUMENTS

| | | | | |
|---|---|---|---|---|
| 5,778,370 A | * | 7/1998 | Emerson | ..................... 707/100 |
| 6,138,139 A | * | 10/2000 | Beck et al. | .................. 709/202 |
| 6,167,395 A | * | 12/2000 | Beck et al. | ..................... 707/3 |
| 6,282,362 B1 | * | 8/2001 | Murphy et al. | ............... 386/46 |
| 6,427,078 B1 | * | 7/2002 | Wilska et al. | ............ 455/550.1 |
| 2002/0101519 A1 | | 8/2002 | Myers | |

FOREIGN PATENT DOCUMENTS

JP   2000/196933   7/2000

OTHER PUBLICATIONS

Patent Abstracts of Japan, Pub. No. 2000-196933, Date: Jul. 14, 2000.

* cited by examiner

*Primary Examiner*—W. B. Perkey
*Assistant Examiner*—Warren K Fenwick
(74) *Attorney, Agent, or Firm*—Yan Glickberg

(57) ABSTRACT

The invention relates to a method for adding in a device 1, which comprises a camera component 2, metadata to pictures. In order to extend the collection of metadata for such pictures, the method comprises in a first step taking a picture of an object by means of the camera component 2. In a next step, signals comprising information on the object are received via a wireless connection from a communication unit 6 which is associated to the object. In a last step, the received information is stored as metadata together with the data of the picture in a memory 5. The invention relates equally to an electronic device 1 comprising for realizing the proposed method and to a system comprising such a device 1 and moreover a communication unit 6 transmitting information on a device to which it is associated.

12 Claims, 3 Drawing Sheets

ADDING METADATA TO PICTURES

The invention relates to a method for adding in a device, which comprises a camera component, metadata to pictures. The invention relates equally to an electronic device comprising a camera component and to a system comprising such a device.

Digital cameras and other devices comprising a digital camera, for instance mobile phones or PDAs (Personal Digital Assistants), are known from the state of the art. Pictures taken by such digital camera may either be still images or frames of a video.

It is further known to enable cameras to add metadata to the pictures it takes. The added metadata usually comprises date, time and camera settings. Thereby, the user of the camera is supported in creating and managing digital collections.

Japanese patent application JP 2000-196933 moreover proposes to provide a digital camera with a GPS (Global Positioning System) receiver and to determine the current latitude and longitude of the digital camera whenever a picture is taken. Based on the latitude and longitude data, the name of the current location is retrieved from a memory, and weather information is received for the current location via an FM multiplex receiving section from the weather information channels for teletext. Date, time, latitude and longitude data, the name of the current location and the weather information are copied onto the picture, and the picture is stored in a memory.

It is an object of the invention to extend the collection of metadata on pictures taken with a camera component of a device.

A method is proposed for adding in a device, which comprises a camera component, metadata to pictures. The method comprises taking a picture of an object by means of said camera component, receiving from a communication unit associated to said object signals comprising information on said object via a wireless connection, and causing a storage of said information as metadata together with data of said picture. The method may comprise in addition the actual storing in a memory.

Further, an electronic device is proposed which comprises a camera component for taking a picture of an object, a receiver component for receiving via a wireless connection information on an object in a picture taken with the camera component from a communication unit associated to the object, and a processing component for associating information on an object received by the receiving component to data of a picture of the object taken by the camera component and for causing a storage of the information as metadata together with the data of the picture. The device comprise in addition a memory in which the metadata is stored together with the data of the picture.

The electronic device can be a digital camera, e.g. a portable camera or a security camera, comprising a digital camera component, i.e. a component taking care of the actual shooting of pictures, or some other portable or stationary device comprising a digital camera component, e.g. a 3G (3rd Generation) mobile terminal or a PDA. Instead of a digital camera, a camera can be used that stores pictures in an analog way.

Finally, a system is proposed, which comprises on the one hand the proposed electronic device and on the other hand a communication unit with a transmitting component for transmitting information on at least one object via a wireless connection, to which at least one object the communication unit is associated.

In the invention, a picture taken by a camera component may either be a still image or a frame of a video. Moreover, the employed term "object" is to be understood to comprise as well a person. It is further understood that a picture of a plurality of objects may be taken. In this case, information is received for one or more of the objects from an associated communication unit and provided as metadata for the picture. A single communication unit may moreover be associated to one or to several objects.

The invention proceeds from the consideration that wireless communication means of a camera or of a device comprising a camera component can be used for retrieving information on an object of which a picture is taken. The information is added to the picture as metadata and thereby serves as description of the picture.

It is an advantage of the invention that it enables a device comprising a camera component to automatically obtain information on objects of a picture.

Thus, a user of the device does not have to associate a corresponding caption to each pictures him/herself. In addition, information on objects which is not even known to the user may be retrieved and added automatically to the pictures.

Furthermore, the information on objects in moving pictures may be made use of for identifying these objects for an encoding process of the video. For example, the encoding process of MPEG-4 (Moving Pictures Expert Group 4) is suited to make use of an identification of objects in a video stream.

Preferred embodiments of the invention become apparent from the dependent claims.

The information on objects in taken pictures can be provided in various ways.

The information can be provided for example by a mobile device which is carried by a person of whom a picture is taken. Today, many people regularly carry along mobile devices that enable a wireless data connection, for instance a Bluetooth™ enhanced mobile phone or PDA. In this case, the information may be provided for instance in the form of known electronic business card data. Alternatively, each person that is to be identified in one or more pictures may carry along a dedicated identification tag transmitting an identification and possibly further information. A corresponding identification tag can also be attached to other objects of interest, e.g. fixed objects. In a further alternative, information on objects can be provided by a location based server.

The device comprising the camera component may be operated in particular in one of two basic modes, depending on the kind of the unit which provides the information on the respective objects. In a first mode, the device comprising the camera component may search the ether for other devices providing information on persons and/or other objects in the environment. This mode may also be referred to as native search mode. In a second mode, the device comprising the camera component first connects to a unit providing information on objects in the environment, in order to access the desired information. The second mode may also be referred to as service access mode. The device comprising the camera component may support only one of these modes of operation or both.

While the native search mode is particularly suited for receiving information from mobile devices or dedicated identification tags, the service access mode is particularly suited for receiving information from a stationary unit like a location based server. Such a location based server may be provided at a place at which at least one object in the environment is frequently of interest for a picture shooting and stores information on this at least one object.

The received information on an object in a picture can also be enhanced by an information on the location of the object in the picture. The location of the object can be determined based on measurements on the signal strength of received signals and on the direction of received signals. The device comprising the camera component may either store the strength and the direction of signals themselves for a later evaluation, or first determine a location based on the strength and the direction of signals and then store the determined location. In either case, the data is associated to the corresponding information on the object itself. An information on the location of objects in a picture is of particular advantage for supporting the encoding of a video, for example for generating an MPEG-4 stream. In addition, the location information may be of interest in case information on various objects in a picture are obtained.

In the case that the invention is employed for moving pictures, the received information on objects does not have to be stored separately with each frame. The information on different objects can be collected for example during a scene defined by the user and be stored only once for each object appearing in this scene.

These and other aspects of the invention will be apparent from and elucidated with reference to the embodiments described herein after under consideration of drawings.

A first embodiment of the invention will be described with reference to FIGS. 1 and 2.

Figure 1:
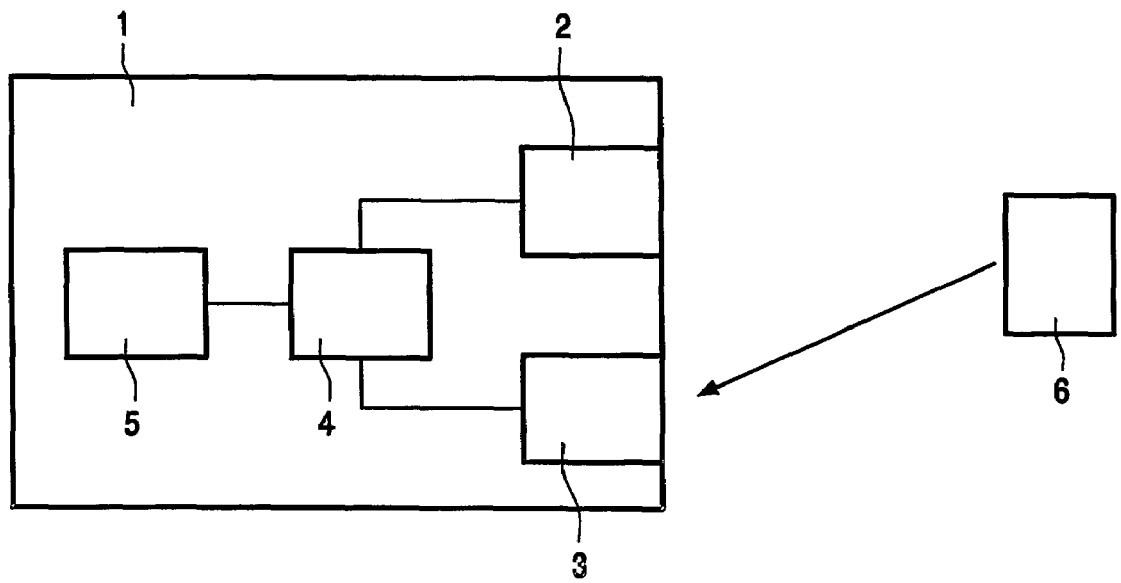
FIG. 1 is a block diagram illustrating schematically a system with an embodiment of the device according to the invention.

The system represented by the simplified block diagram of FIG. 1 includes an embodiment of a device 1 according to the invention. The device 1 is a digital camera 1, which comprises a regular camera component 2 for taking digital images as known from the state of the art. Further, it comprises a transceiver 3 supporting a wireless, Bluetooth™ based connection. The camera component 2 and the transceiver 3 are both connected to a processing unit 4, which is further connected to a memory 5. Other components that may be comprised by the digital camera 1 are not depicted. The system in FIG. 1 moreover includes a Bluetooth™ enhanced mobile device 6.

Figure 2:
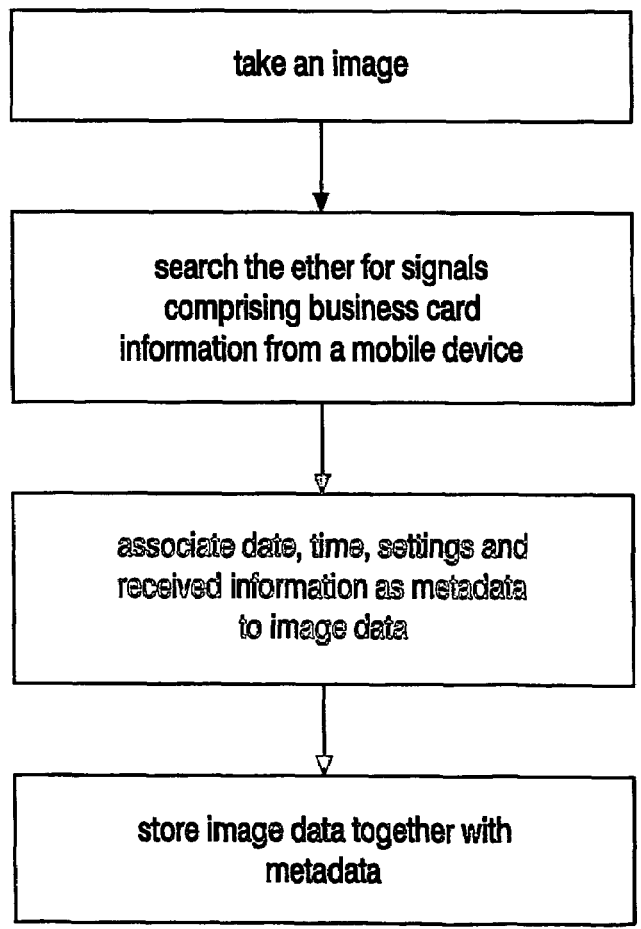
FIG. 2 is a flow chart illustrating a first embodiment of the method according to the invention.

The flow chart of FIG. 2 illustrates an embodiment of the method according to the invention implemented in the digital camera 1 of FIG. 1.

When a user of the digital camera 1 takes an image of a person by means of the camera component 2 of the digital camera 1, the transceiver 3 of the digital camera 1 searches in addition the ether for signals by a Bluetooth™ enhanced mobile device. In case the photographed person carries such a Bluetooth™ enhanced mobile device 6, the transceiver 3 of the digital camera 1 will detect this mobile device 6. In case the photographed person moreover activated a transmission of business card data, the transceiver 3 of the digital camera 1 then receives automatically the business card data from the detected mobile device 6. Instead of simply receiving business card data, the digital camera 1 could also exchange business cards by transmitting its own business card data.

The data of the taken image is forwarded by the camera component 2 to the processing unit 4. The data comprises as metadata the date and the time when the image was taken, as well as information on the camera settings employed when taking the image. The transceiver 3 forwards the received business card data to the processing unit 4.

The processing unit 4 adds the business card information to the image data as additional metadata, and stores the image together with the entire metadata in the memory 5.

When viewing images retrieved from the memory 5, the user is now able to identify a person on a presented image by means of the metadata comprising the business card information of the photographed person.

Figure 3:
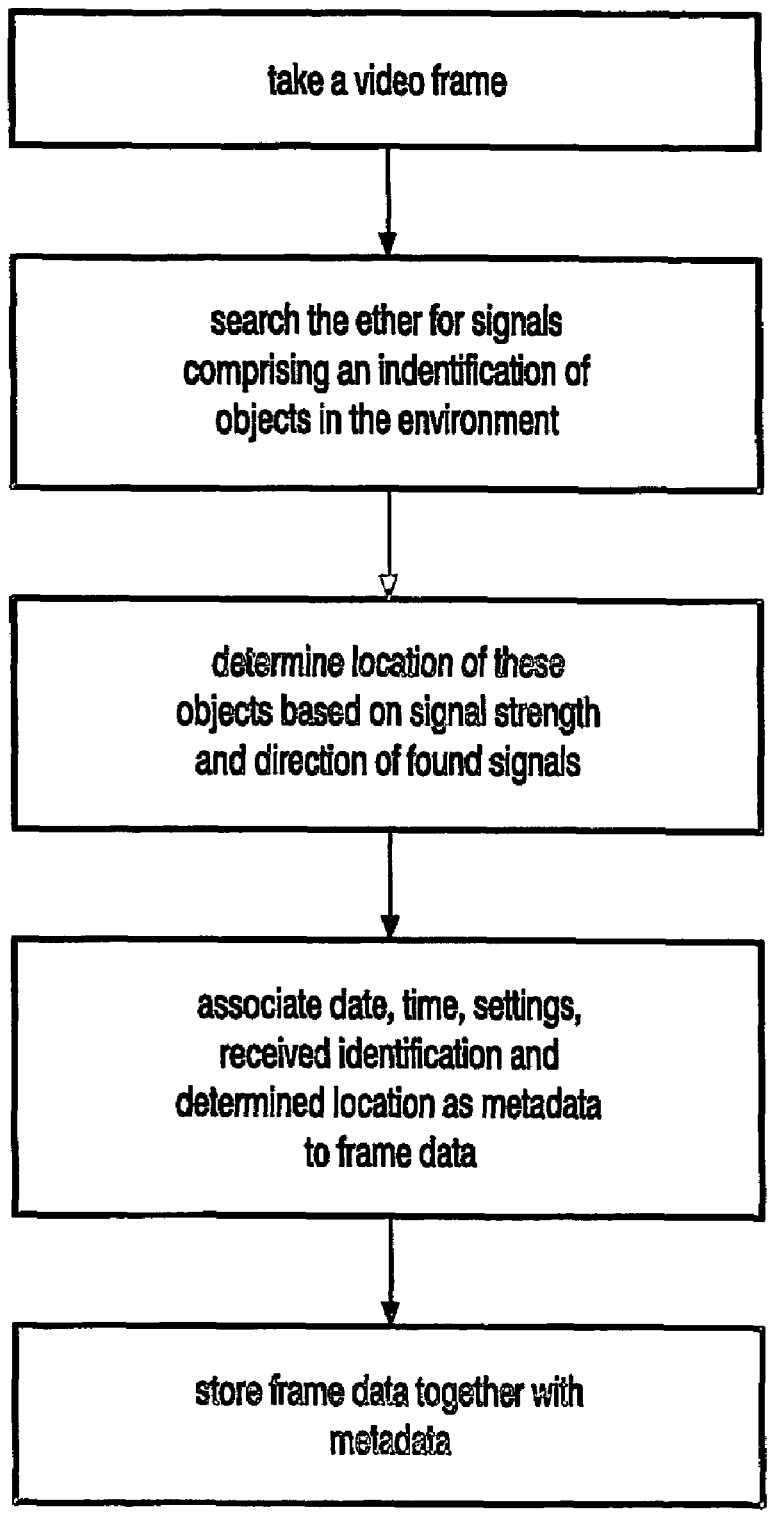
FIG. 3 is a flow chart illustrating a second embodiment of the method according to the invention.

A second embodiment of the invention will now be described with reference to FIG. 3. FIG. 3 is a flow chart illustrating an embodiment of the method according to the invention, which is implemented in a digital camera employed in a professional shooting of a film.

The structure of the digital camera in the second embodiment of the invention correspond basically to the structure of the digital camera 1 shown in FIG. 1. In this case, however, the regular digital camera component 2 of the digital camera 1 is a digital film camera component which enables a professional shooting of moving pictures.

In the environment of the film set, each person that is to appear in the film wears an identification tag. Furthermore, an identification tag is attached to each object of particular interest. Each identification tag continuously transmit an identification information for the person or the object to which it is associated. The identification information can simply consist in a number which is different for all persons and objects that are to be identified. The transmission is a Bluetooth™ based transmission.

When a video frame is taken by means of the digital camera component 2 of the digital camera 1, the transceiver 3 of the digital camera 1 automatically searches the ether for Bluetooth™ based signals transmitted by identification tags. The digital camera component 2 provides the taken video frame data together with date, time and settings information to the processing unit 4, while the transceiver 3 provides the identification information comprised in the received signals together with an indication of the signal strengths and the directions from which the signals are received to the processing unit 4.

The processing unit 4 evaluates the received indication of the signal strengths and of the directions from which the signals were received by the transceiver 3, in order to determine the location of the object to which the identification tag transmitting a respective signal is associated.

Then, the received identification information and the determined location information is added by the processing unit 4 as metadata to the respective video frame, together with the date, the time and the current settings of the digital camera 1.

The data of the respective video frame is finally stored in the memory 5 together with the entire associated metadata.

The stored metadata can now be made use of in various ways.

For example, when arranging a DVD based on the video taken by the digital camera, an information about the identified actors and objects in a respective scene can be added to the DVD for each scene. As a result, more features are available for a user on the DVD.

Further, the metadata in the stored video can be employed for encoding the video to form an MPEG-4 stream. More specifically, the video content is analyzed for encoding by localizing objects in the video streams based on the stored identification and location of objects in each video frame.

Figure 4:
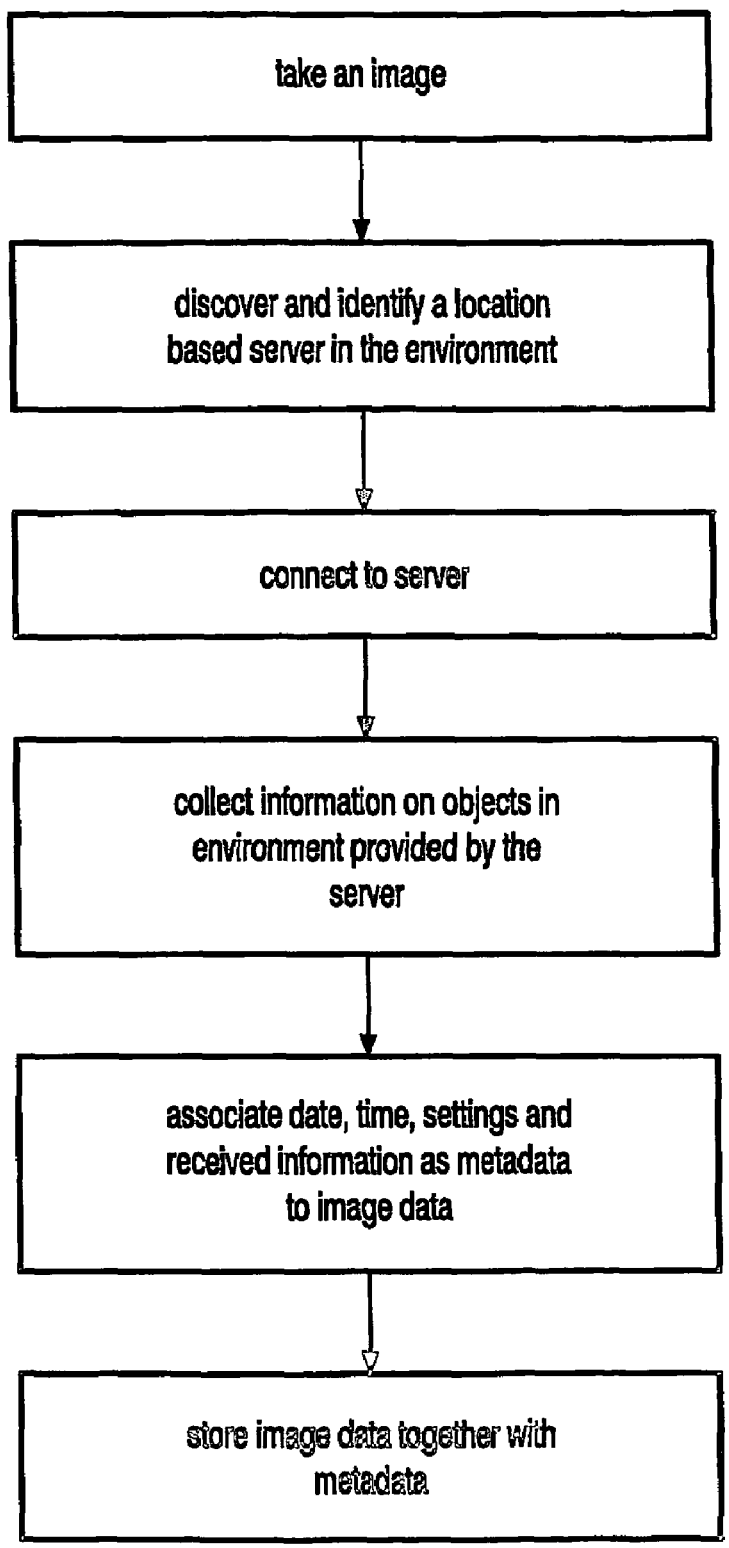
FIG. 4 is a flow chart illustrating a third embodiment of the method according to the invention.

A third embodiment of the invention will be described with reference to FIG. 4. FIG. 4 is a flow chart illustrating an embodiment of the method according to the invention, which is implemented in a mobile phone comprising a digital camera component. The mobile phone is to be used in an amusement park for taking images of objects in the park.

The mobile phone is a 3G mobile phone comprising all features required for regular mobile communications. In addition, it comprises a digital camera component, a Bluetooth™ transceiver, a processing unit, and a memory, just like the digital camera shown in FIG. 1. These components may partly be provided anyhow for the regular functions of the mobile phone.

In the amusement park, a location based server is provided, in which information on objects in its environment is stored. The location based server comprises a Bluetooth™ transceiver for continuously transmitting information on its own identity and for enabling portable devices to access the server via a wireless Bluetooth™ connection.

While the digital camera of the first and the second embodiment operates in a native search mode, the mobile phone in the third embodiment operates in a service access mode.

When the user of the mobile phone takes a picture by means of the digital camera component of the mobile phone while the mobile phone is set to a service access mode, the transceiver of the mobile phone automatically discovers and identifies the location based server based on the transmitted identity information. Next, the transceiver of the mobile phone connects to the location based server via a wireless Bluetooth™ connection by transmitting a unique identification of the mobile phone.

Thereupon, the location based server transmits information concerning objects in the environment to the mobile phone, which automatically collects the information. The transmission is encoded such that it can only be decoded by the mobile phone connected to the location based server.

The application in the location based server comprises a payment model. Based on the identification transmitted by the mobile phone when accessing the location based server, the location based server is able to charge the user of the mobile phone for the provided service on the phone bill of the user. Thus, the owner of the camera has to pay the provided service.

As in the first embodiment, the data of the taken image is forwarded by the camera component to the processing unit. The data comprises again as metadata the date and time when the image was taken and information on the camera settings employed when taking the image. The Bluetooth™ transceiver of the mobile phone forwards the information collected from the location based server to the processing unit. The processing unit adds the information to the image data as additional metadata, and stores the image together with the entire metadata in the memory.

When viewing images retrieved from the memory, the user is then able to obtain additional information on the pictures by means of the metadata comprising the information on the objects which were located in the environment of the location based server.

It is to be noted that the described embodiments of the invention constitute only selected ones of many possible embodiments of the invention.

The invention claimed is:

1. Method for adding in a device, which comprises a camera component, metadata to pictures, said method comprising:
   taking a picture of an object by means of said camera component;
   receiving from a communication unit associated to said object signals comprising information on said object transmitted from said object via a wireless connection; and
   causing a storage of said information as metadata together with data of said picture.

2. Method according to claim 1, comprising searching the ether for signals comprising information on said object, which signals are transmitted from said object via the air interface by a communication unit associated to said object.

3. Method according to claim 1, comprising searching and identifying a communication unit associated to said object based on identification signals transmitted by said communication unit, and connecting to said identified communication unit, in order to cause said communication unit to transmit signals comprising information on said object.

4. Method according to claim 1, further comprising determining strength and direction of signals comprising information on said object when received at said device, and storing an information on said signal strength and said direction of signals as additional metadata together with said data of said picture of said object.

5. Method according to claim 1, further comprising determining a location of said object by evaluating strength and direction of signals comprising information on said object when received at said device, and storing an information on said location as additional metadata together with said data of said picture of said object.

6. Method according to claim 1, wherein said communication unit is a mobile device carried by a person, and wherein said information consists in business card information transmitted by said mobile device via a wireless connection.

7. Method according to claim 1, wherein said communication unit is a dedicated identification tag which is arranged at or close to an object and which transmits an information identifying said object via a wireless connection.

8. Method according to claim 1, wherein said communication unit is a location based server which is associated to at least one object in the environment of said location based server and which can be caused by said device to transmit signals comprising information on said at least one object.

9. Electronic device comprising:
   a camera component for taking a picture of an object;
   a receiver component for receiving via a wireless connection information from an object in a picture taken with said camera component from a communication unit associated with said object; and
   a processing component for associating information on an object received by said receiving component to data of a picture of said object taken by said camera component, and for causing a storage of said information as metadata together with said data of said picture.

10. System comprising an electronic device with
   a camera component for taking a picture of an object;
   a receiver component for receiving via a wireless connection information on an object in a picture taken with said camera component from a communication unit associated to said object; and
   a processing component for associating information on an object received by said receiving component to data of a picture of said object taken by said camera component, and for causing a storage of said information as metadata together with said data of said picture;
   the communication unit further comprising a transmitting component for transmitting information from the object via a wireless connection.

11. The electronic device according to claim 9, wherein said communication unit continually transmits said information on said object.

12. The system according to claim 10, wherein said transmitting component continually transmits said information on said object.

* * * * *